Jan. 6, 1959  J. F. SMITH ET AL  2,866,987
SHOE PRESSES

Filed Dec. 7, 1953  8 Sheets-Sheet 1

Inventors:
John F. Smith and Fred Dawson
By John F. Smith
Attorney

Inventors:
John F. Smith and
Fred Dawson

Inventors:
John F. Smith and
Fred Dawson
by John F. Smith
Attorney

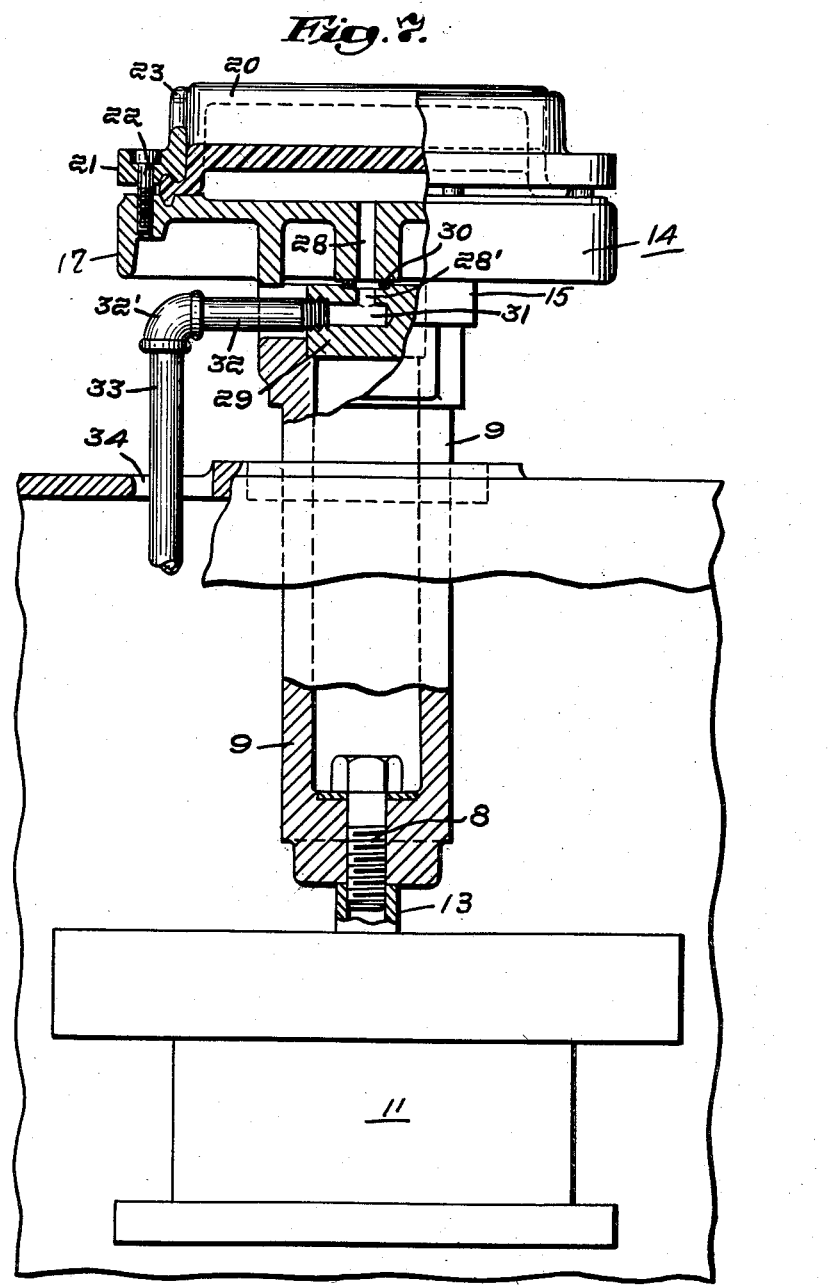

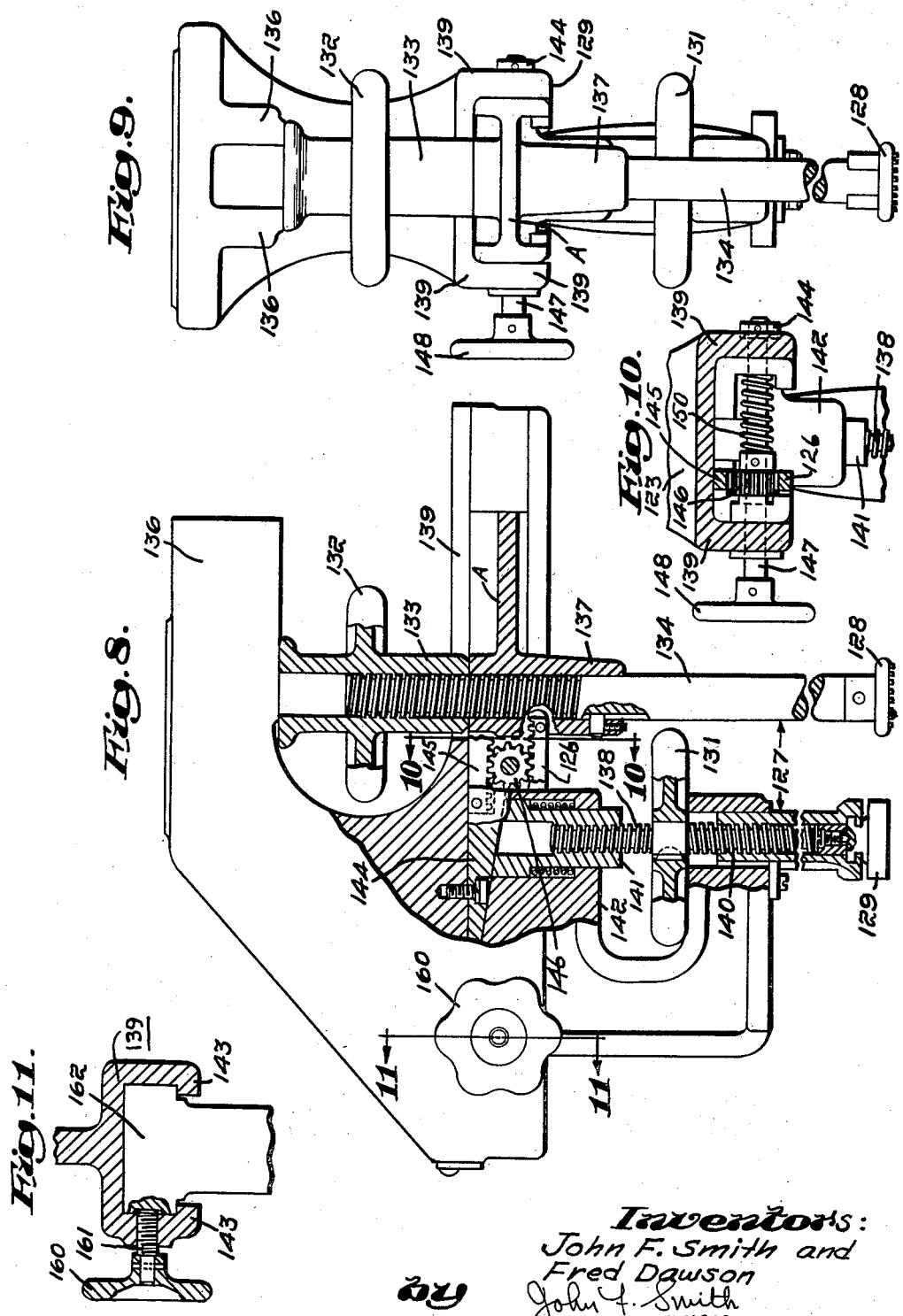

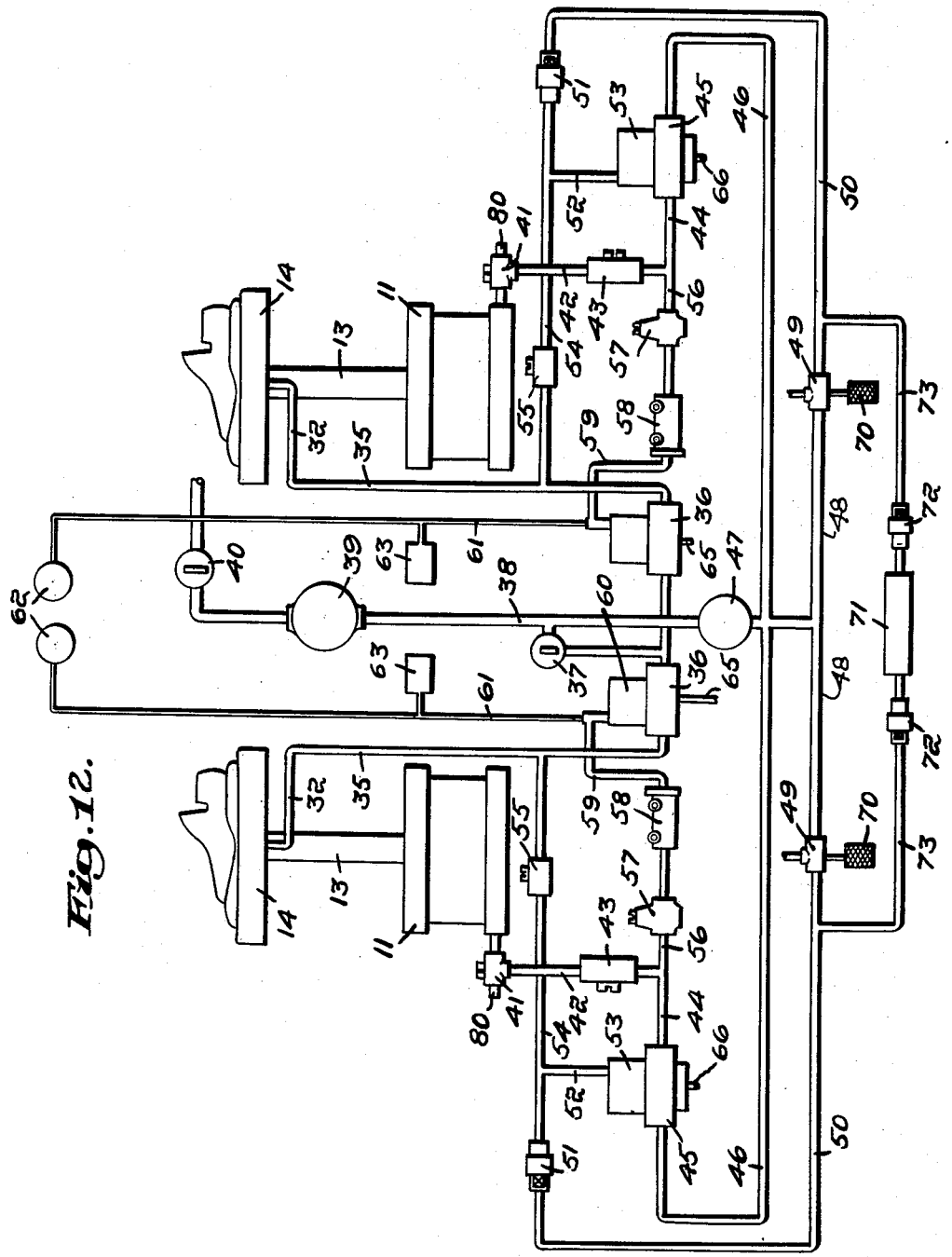

Jan. 6, 1959
J. F. SMITH ET AL
2,866,987
SHOE PRESSES
Filed Dec. 7, 1953
8 Sheets-Sheet 8
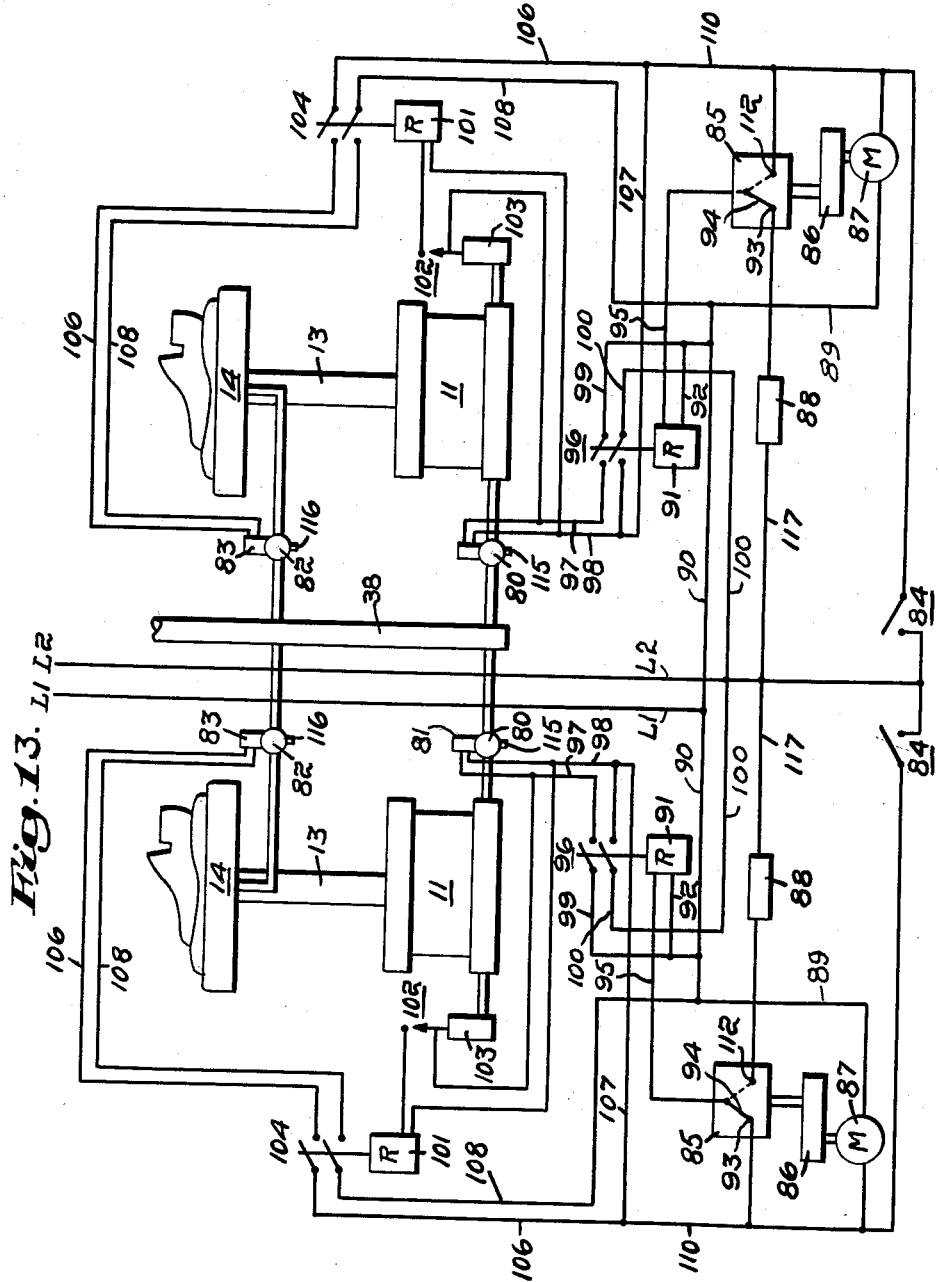
Inventors:
John F. Smith and
Fred Dawson
by John F. Smith
Attorney United States Patent Office 2,866,987
Patented Jan. 6, 1959

2,866,987
SHOE PRESSES

John F. Smith, Braintree, and Fred Dawson, West Roxbury, Mass., assignors to Compo Shoe Machinery Corporation, Boston, Mass., a corporation of Delaware Application December 7, 1953, Serial No. 396,516

11 Claims. (Cl. 12—36)

This invention relates to presses in which press members are moved by fluid under pressure to apply pressure to work pieces, and relates more particularly to shoe presses in which pressure is applied to shoe soles for causing them adhesively to adhere to shoe uppers.

A feature of this invention is that an inflatable pad is supported upon a piston rod movable in a cylinder under fluid pressure. After the shoe assembly has been placed upon the pad, the piston is rapidly moved up to take up the clearance required for placing the shoe assembly in position on the pad. The pad is then inflated to provide the final pressure against the shoe sole. The combination of the pad and cylinder provide for quick operation. The inflatable pad enables many different sizes and shapes of shoes to be handled without any adjustments of the usual shoe jacks used with such presses.

Another feature of this invention is that each inflatable pad used has no inner inflatable tube, and instead, has a bead held in a clincher type rim on the pad box.

Another feature of this invention is that each pad box is not bolted to its support but is located thereon by pins so that the box can be easily removed from its support by lifting it to clear the pins. A seal around the fluid passage in the support for the pad box and around the aligned fluid passage in the pad box and between the two fluid passages, automatically seals the assembly against leakage of fluid when the pad box is in position upon its support.

Another feature of this invention is that each pad box is rotatable upon its support through an angle of 90 degrees for facilitating the handling of shoe assemblies by operators of such presses.

Another feature of this invention is that means is provided for easy and rapid movement of a heel support and a toe support relative to each other, and together, for facilitating the handling of shoes having different lengths and shapes.

An object of this invention is to provide a shoe press which can be quickly operated, and which without adjustment, can handle different sizes and shapes of shoes.

Another object of this invention is to locate an inflatable pad for receiving a shoe assembly, sufficiently below the upper shoe jack of the press, that sufficient space is provided for placing the shoe assembly upon the pad; to then move the pad with the shoe assembly thereon upwardly until the shoe upper contacts the jack, and then to inflate the pad for applying final pressure between the shoe sole and shoe upper.

Another object of this invention is to provide an inflatable pad which can be quickly and easily removed from its support.

Another object of this invention is to provide an inflatable pad which can quickly and easily be rotated upon its support.

Another object of this invention is to provide an inflatable pad without an inner tube.

Another object of this invention is to provide for rapid and easy adjustment of a heel support and a toe support relative to each other, and together.

This invention will now be described with reference to the drawings, of which:

Fig. 7 is an end elevation, partially in section, of the pad box of Figs. 5 and 6; and of the parts for moving the pad box;

Fig. 8 is a side elevation, partially in section, of the mechanism for moving the heel supports towards and away from the toe supports;

Fig. 9 is an end elevation of Fig. 8;

Fig. 10 is a detail view showing the construction of the spur gear and racks of Fig. 8;

Fig. 11 is a sectional view along the line 11—11 of Fig. 8;

Fig. 12 is a diagrammatic view of the invention showing piping with pneumatic controls, and Fig. 13 is a diagrammatic view of the invention showing piping and electrical controls.

Figure 1:
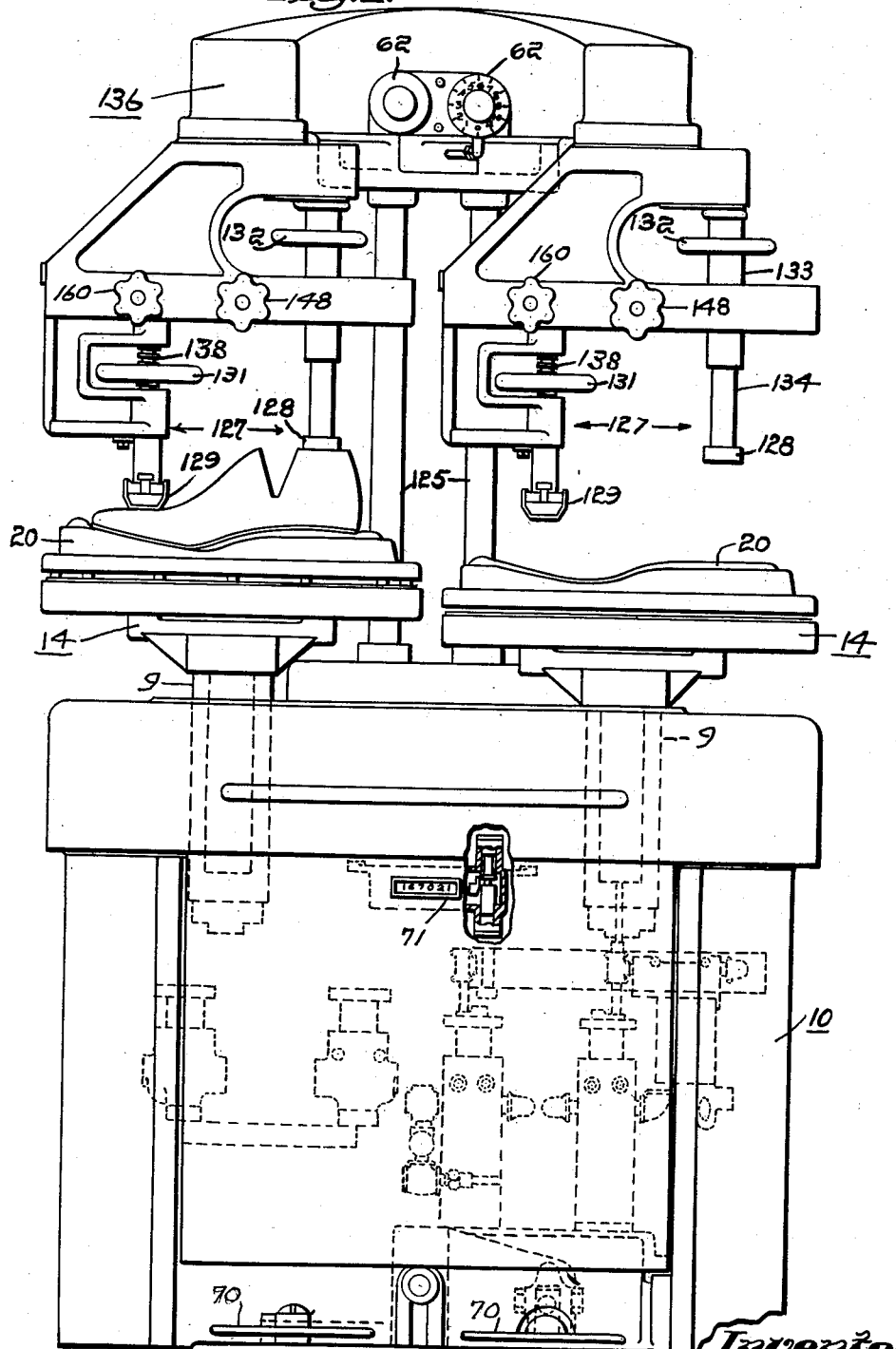
Fig. 1 is a side elevation of one embodiment of this invention in which two operating stations are provided.
Figure 2:
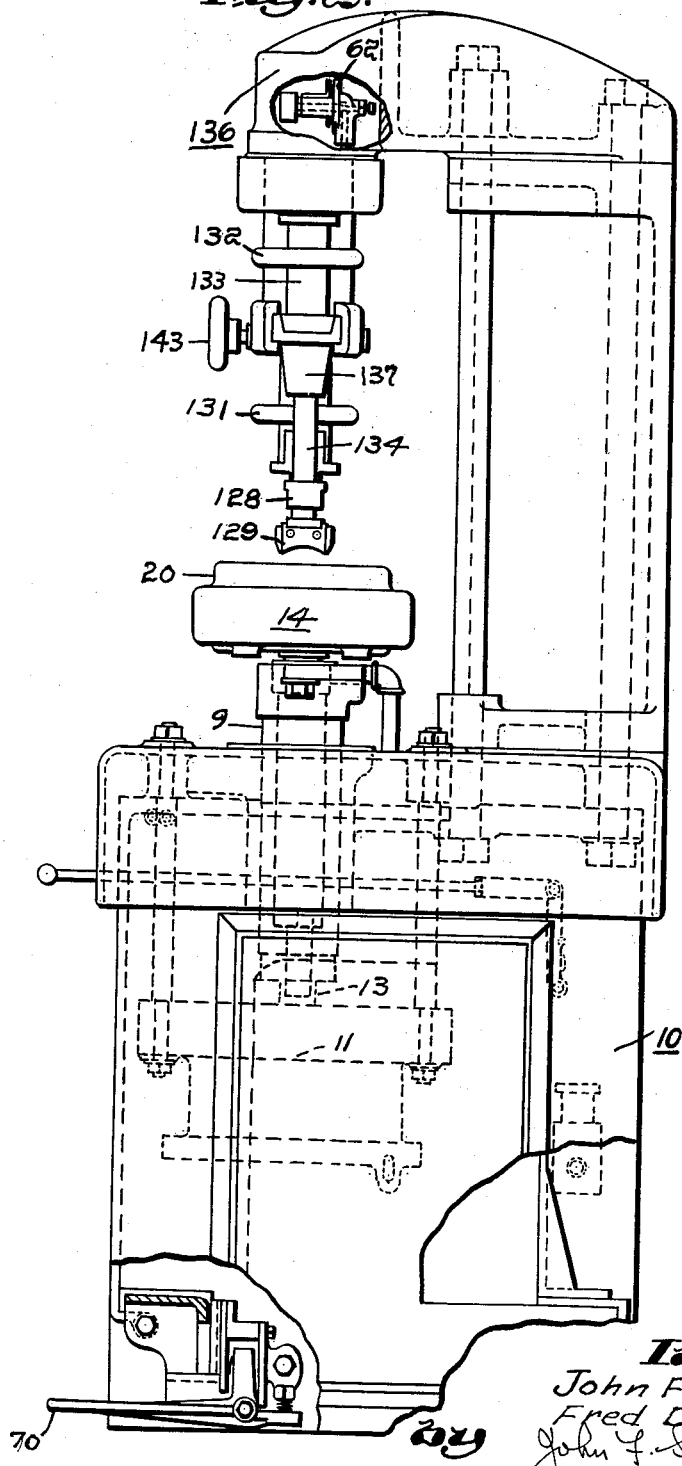
Fig. 2 is an end elevation of Fig. 1.
Figure 3:
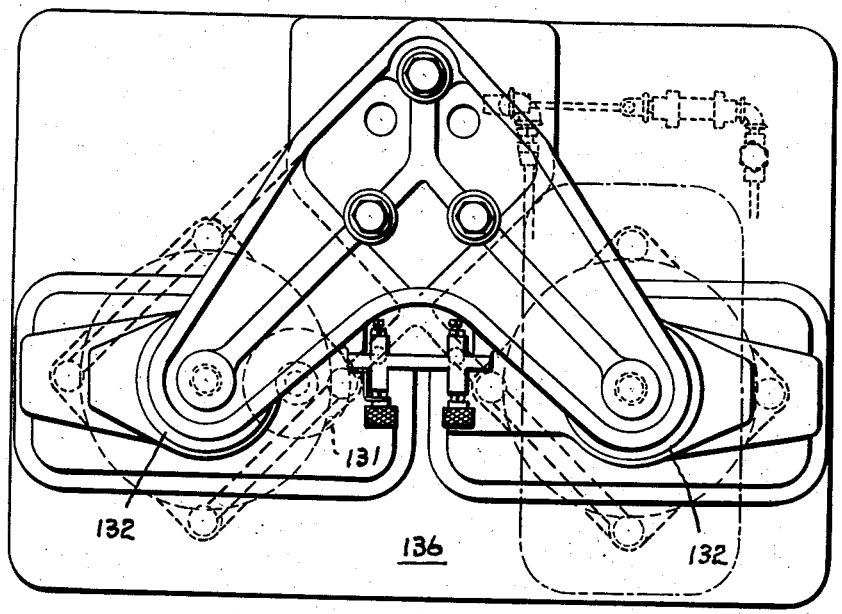
Fig. 3 is a plan view looking downwardly upon Fig. 1.

The embodiment of the invention illustrated by the drawings is a two station unit having a base 10 to which are supported the shoe elevating cylinders 11 which contain the ram pistons 13 to the upper ends of which the lower ends of the guides 9 are attached by the bolts 8. The members 15 which support the pad boxes 14 are attached to the upper ends of the guides 9.

The lower members 17 of the pad boxes are positioned by the pins 18 which are force fitted in the members 15 and which extend into cylindrical openings in the lower members 17 which have slightly larger diameters than the pins.

Each lower pad member 17 has a recessed portion around its rim and in which is held the lower portion of the beaded portion 19 formed on the edge of the inflatable pad 20. The upper pad member 21 has a similar recessed portion in which is held the upper portion of the beaded portion 19 of the pad 20. The upper pad member is held to the lower pad member 17 by the screws 22, and has an inner upstanding portion 23 which extends around and contacts the upstanding portion 24 of the pad above and inside the beaded portion 19.

The filler blocks 25 and 26 are secured to the lower pad members 17 by the screws 27, and serve to reduce the space between the pad 20 and the lower pad member 17 so as to reduce the volume of compressed air required to inflate the pad.

Each lower pad member 17 has a bore 28 which is lined-up with a similar bore 28' in the circular block 29. The gasket 30 separates the lower pad member 17 and the block 29 around the space between the bores 28 and 28', and forms a seal which prevents compressed air from leaking as it passes into the bore 28.

Figure 4:
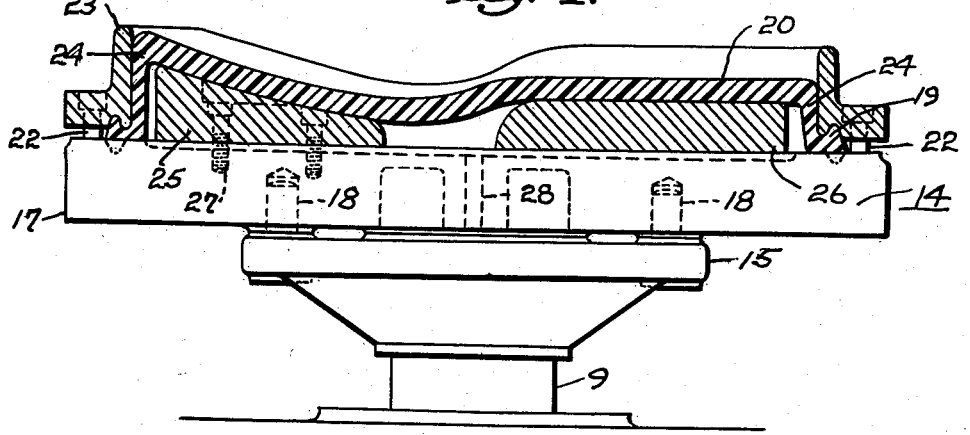
Fig. 4 is a side elevation partially in section, of one of the pad boxes which may be used, and which has an inflatable pad for handling women's flat style shoes.
Figure 5:
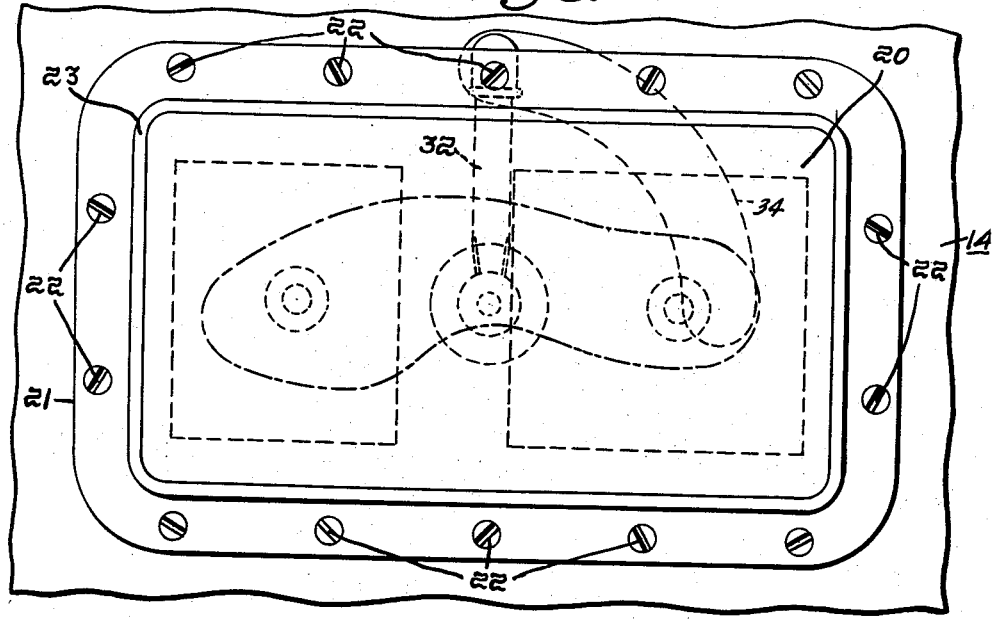
Fig. 5 is a plan view looking downwardly upon Fig. 6.
Figure 6:
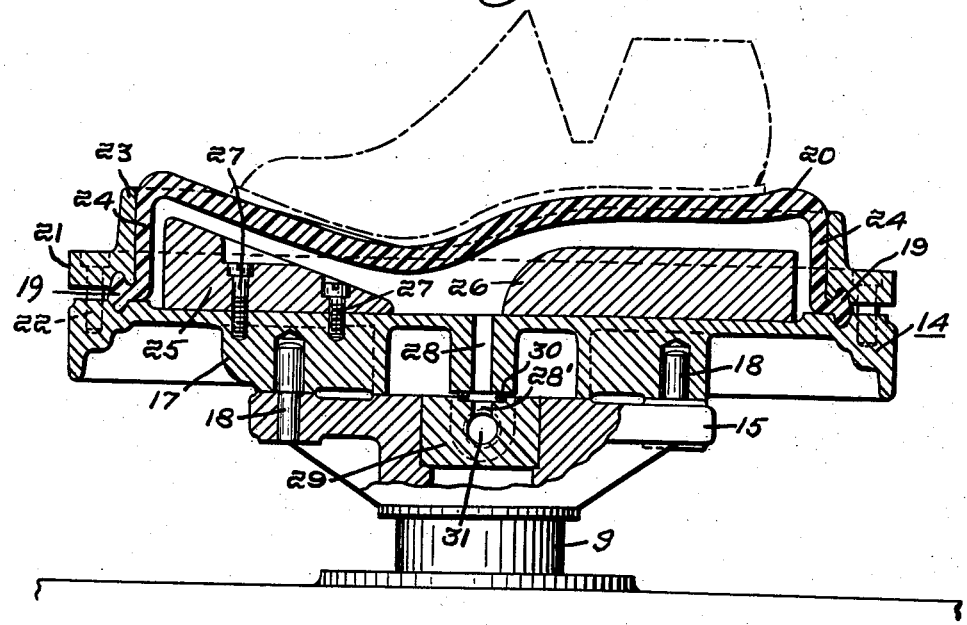
Fig. 6 is a side elevation, in section, of a pad box which may be used, and which has an inflatable pad for handling women's regular style shoes, the pad being shown inflated.

Each bore 28' opens into a horizontally extending bore 31 which connects with a pipe 32 which is threaded into a block 29. A vertically extending pipe 33 is connected to a pipe 32 by an elbow 32', and extends through a curved slot 34 in the top of a base 10. The pad boxes 14 are rotatable with the piston 13 about the axis of the latter for positioning the pad boxes at angles of 90° to that shown by Figs. 4, 5, 6 and 7. The pipes 33 are connected through the piping 35, the pilot valves 36 and the pressure regulator 37 to the main supply piping 38 which is connected through the air cleaner 39 and pressure regulator 40 to a conventional source of compressed air which is not illustrated.

The pad boxes 14 are easily lifted by an operator to clear the pins 18 for removal and replacement. For replacement it is only necessary to line-up the cylindrical openings in the lower pad member 17 for the pins 18, with corresponding pins, and then to lower the pad boxes into position. The gaskets 30 prevent leakage.

The shoe elevating cylinders 11 are connected by the valves 41, piping 42, speed control valves 43, piping 44, pilot valves 45, piping 46 and lubricator 47 to the main air supply piping 38. The valves 41 have exhaust pipes 80 connected thereto.

The main air supply piping is also connected through the lubricator 47 to the piping 48 connecting through the treadle valves 49, the piping 50, check valves 51 and piping 52 to the cylinders 53 of the pilot valves 45, and through the piping 54, and bleeder valves 55 to the piping 35 connected to the pad boxes 14. The treadles 70 are attached to the valves 49 which they open when depressed by an operator.

The pilot valves 45 are also connected by the piping 44, the piping 56, sequence valves 57, meter valves 58 and piping 59 to the air cylinders 60 of the pilot valves 36, and to the bleed tubes 61 which connect through the timing valves 62 with the atmosphere. The safety valves 63 are connected to the bleed tubes 61 at points between the timing valves 62 and the piping 59.

The pilot valves 36 and 45 have the exhaust tubes 65 and 66 respectively, connected to atmosphere.

The conventional Veeder Root counter 71 is connected through the check valves 72 and piping 73 to the piping 50.

The base 10 of the press has supported therefrom by the rods 125 an overhead framework 136 from which are supported the jacks 127, each of which comprises a heel support 128 and a toe support 129. The toe supports 129 are attached to the lower ends of rods 138 which are threaded in the sleeves 141 and are adapted to be rotated by the handwheels 131 for raising and lowering the toe supports.

The heel and toe supports can be moved quickly towards and away from each other, and can be moved together longitudinally of the pad for facilitating the handling of many different sizes, lengths and shapes of shoes.

The heel supports 128 are attached to the rods 134 which have threaded upper portions threaded in the sleeves 133 to which the hand wheels 132 are attached for movement of the rods, and in the slide members 137 which have the channel sections A. The outer portions of the slide members 137 are formed as channels which are fitted slidably in the channel portions 139 of the frames 136. The inner portions of the slide members 137 have the gear racks 126 attached thereto.

The upper portions of the sleeves 133 are flat and contact the flat undersurfaces of the outer portions of the frame members 136 which serve as guides and supports. The flat lower ends of the sleeves 133 are rotatably supported by the flat upper surfaces of the slide members 137 around the rods 134.

The toe supports 129 are attached to the threaded rods 138 which are threaded in the sleeves 140 and 141 which are secured to the slide members 142 which have inner portions which are slidably fitted in the channel portions 143 of the frame. The rods 138 have the hand wheels 131 attached thereto for rotation of the rods.

The slide members 142 have the gear racks 145 attached thereto and which extend over the racks 126 and parallel thereto. The spur gears 146 engage the racks 126 and 145, and are attached to the rods 147 which extend through sides of the channel portions 139 and have the hand wheels 148 attached thereto for rotation of the gears 146. The sides of the gears 146 opposite the hand wheels 148 contact the adjacent ends of the coiled springs 150, the other ends of which contact the inner surfaces of the other sides of the channel members 139. The ends of the rods 147 opposite the hand wheels 148 have the collars 144 thereon.

By pushing inwardly on the hand wheels 148, the gears 146 can be moved inwardly out of mesh with the racks 126 and 145, the springs 150 restoring the gears to their meshed positions when the hand wheels 148 are released.

A hand wheel 160 is secured to each shaft 161 which is threaded into one of the sides of a channel portion 139 as shown by Fig. 11. The inner end of the shaft 161 contacts a side portion 162 of a slide member 142 when the shaft 161 is rotated in a clockwise direction, and clamps the slide member 142 in position.

By rotating the hand wheel 160 in a counter-clockwise direction, its associated slide member 142 is unclamped and is free to move. By pushing in its associated hand wheel 148, its associated gear 146 is unmeshed from its racks 126 and 145. Then the heel and toe supports are freely movable towards and away from each other, enabling them quickly to be positioned for proper handling of a shoe to be cemented. A wedge 144 causes a toe support automatically to be lowered as it approaches its associated heel support, and vice versa. Then, when a gear 146 is meshed with its racks 126 and 145, its hand wheel 148 can be rotated to move the heel and toe supports in unison longitudinally of a shoe placed on a pad 14 for correct positioning of the supports upon the shoe upper.

OPERATION OF FIG. 12

In the operation of the embodiment of the invention illustrated by Fig. 12, one operator would handle the two stations as follows: Assume the left shoe press to be operated first so that the apparatus to the left of the center of Fig. 12 will be operated, a shoe assembly would be placed on the left pad box 14. At this time this pad box would be in its lowermost position for providing adequate space between it and its associated heel and toe supports to permit the quick location of the shoe assembly upon the pad. Adjustments of the heel and toe supports would be made for accommodating the type of shoe to be handled.

The operator would then depress the left foot treadle 70 following which the following sequence of operations would automatically occur, reference being made to the components of the left press. Compressed air would be admitted by the valve 49 operated by the treadle, into the piping 50, and through the check valve 51 and piping 52 into the air cylinder 53 of the pilot valve 45, causing the valve 45 to open and admit compressed air supplied through the piping 46 to pass through the speed control valve 43 and valve 41 into the cylinder 11 of the shoe elevating press, causing the ram piston 13 to rise and move the pad box 14 with the shoe assembly thereon, upwardly until the shoe upper just contacts the heel and toe supports.

At the same time, compressed air would pass through the valve 45, the piping 44, the delay valve 57 and meter valve 58 into the cylinder 60 of the pilot valve 36 causing the valve 36 to open and admit compressed air supplied through the valve 37 to pass through the piping 35 and 32 and inflate the pad in the pad box 14 causing it to rise up and move the shoe assembly firmly against the heel and toe supports. The delay valve 57 would prevent the inflation of the pad until after the air admitted into the cylinder 11 has moved the pad box to its uppermost position. The shoe pad remains in its inflated position for an interval determined by the setting of the timing valve 62. The valve 62 has a bleed port open to atmosphere, and bleeds air from the cylinder 60 of the pilot valve 36 through the bleed tube 61. After the selected interval of time, the air bled from the cylinder 60 causes the valve 36 to close off the supply of compressed air from the valve 37, and to connect the piping 35 to the exhaust pipe 65. The compressed air in the shoe pad then leaks to atmosphere through the pipe 65 and the pad deflates.

Air is also bled from the cylinder 53 of the pilot valve 45 through the piping 54 and bleed valve 55, and exhausts through the pipe 65 to atmosphere, causing the valve 45 to close off the supply of compressed air through the piping 46, and to connect the piping 44 with the exhaust pipe 66. The compressed air in the cylinder 11 then exhausts through the valve 41, piping 42, speed control valve 43, piping 44, valve 45 and exhaust pipe 66 to atmosphere. When this exhaust action starts, the valve 41 which is a dump valve, connects the cylinder 11 with the exhaust pipe 80 through which the cylinder 11 quickly exhausts. The ram piston 13 then moves downwardly carrying the pad box 14 down with it, and providing clearance below the heel and toe supports for easy removal of the cemented shoe.

The operator has only to place momentary pressure on the foot treadle 70 for first opening and then closing the valve 49 for causing the sequence of operations described in the foregoing, a slug of compressed air being sufficient to operate the pilot valve 36. This is accomplished through the use of the meter valve 58 which may be a Schrader type No. 3004 cutout valve. After momentarily depressing the treadle 70 of the left hand press, then the operator can proceed to operate the other station by first placing a shoe assembly on the right hand pad, then depressing the right hand treadle 70, and causing the right hand station to go automatically through the same sequence of operations described in the foregoing in connection with the left hand station. At the end of the second sequence of operations, the first station will have completed its sequence of operations so that it can again be set up to handle another shoe assembly, and so on, the two stations being placed alternately in operation, but both operating at the same time.

As each treadle 70 is depressed it admits a slug of compressed air into the counter 71 causing it to register the number of shoes handled by the press.

*Description of Fig. 13*

In Fig. 13 the compressed air from the supply piping 38 is supplied to the press cylinders 11 through the valves 80 actuated by the electric solenoids 81, and the compressed air for the pad boxes 14 is supplied from the piping 38 through the valves 82 actuated by the solenoids 83.

The treadles actuated by the operator are electric switches 84. The electric timers 85 driven through the gear boxes 86 by the electric motors 87 control the deflation of the pad boxes and press cylinders. The timers are of the automatic re-set type such as are manufactured by the Eagle Signal Company. An electric counter 88 is actuated at the end of each operation.

OPERATION OF FIG. 13

The following description is of the left hand press. When the treadle switch 84 is closed, the timer motor 87 is connected through the switch 84 to the electric line L2, and through the wiring 89 and 90 to the other electric line L1. At this time, the relay 91 is connected through the wiring 95, the movable contact arm 94 and fixed contact 93 of the timer and switch 84 to the line L2, and through the wiring 92 and 90 to the other line L1. The motor 87 and the relay 91 are therefore energized by the closing of the treadle switch.

The energization of the relay 91 causes it to close the relay switch 96 which connects the solenoid 81 through the wiring 97, 99 and 90 to the electric line L1, and through the wiring 98 and 100 to the other electric line L2. This energizes the solenoid 81 and causes it to actuate the valve 80 to admit compressed air from the piping 38 into the press cylinder 11.

The energizing winding of the relay 101 is connected in series with the switch 102 across the energizing winding of the relay 80. The switch 102 is closed a predetermined interval of time after the closing of the relay switch 96 by a rise in pressure in the cylinder 103 connected to the press cylinder 11. The relay 101 is thus energized a predetermined period of time after air is admitted into the cylinder 11, and closes the switch 104 which connects the solenoid 83 through the wiring 106 and 107, the closed switch 96 and wiring 100 to the electric line L2, and through the wiring 108 and 90 to the other electric line L1. The solenoid 83 is then energized, and actuates the valve 82 to admit compressed air from the piping 38 into the pad box 14.

By the time air has been admitted into the pad box 14, the ram piston 13 of the cylinder will have risen to place the shoe assembly on the pad box, against the heel and toe supports. Inflation of the pad will then take place, and the shoe assembly will be pressed firmly against the heel and toe supports as described in the foregoing in connection with Fig. 12.

The left hand treadle switch 84 will have been closed only momentarily by the operator, but the timer motor 87 and the relays and solenoids will remain energized until the timer 85 times out, by a holding circuit including the wiring 110, 107 and 100 connecting the motor, relays and solenoids to the line L2 to which the treadle switch formerly connected them.

After a predetermined period of time, the timer 85 will time out, and its movable contact arm 94 will be moved away from the timer contact 93 and against the contact 112. This opens the energizing circuits of the timer motor 87 and the relay 91. The timer stops timing and the relay 91 is deenergized and opens the switch 96. This deenergizes the solenoid 81 causing it to actuate the valve 80 to close off the supply of compressed air, and to connect the press cylinder 11 to the exhaust pipe 115 through which the air in the cylinder exhausts so that the piston 13 moves the pad box 14 downwardly. At the same time the relay 101 is deenergized causing the switch 104 to open and to deenergize the solenoid 83 causing the valve 82 to close off the supply of compressed air into the pad box, and to connect the pad box to the exhaust pipe 116 through which the pad exhausts so that it deflates.

The movement of the contact arm 94 of the timer against the contact 112 when the timer times out, connects the counter 88 through the wiring 95, relay 91 and wiring 90 to the electric line L1. The counter is connected through the wiring 117 to the line L2. The counter is thus energized to indicate that another shoe assembly has been processed. The relay 91 requires more current to operate it than the counter 88 does so that the counter is operated without the relay being operated.

When the timer motor stops, the contact arm 94 is automatically reset against the contact 93 so that the control is ready for the next operation.

As in the case of Fig. 12 when an operator has momentarily depressed the left hand treadle switch to place the left hand press in operation following which the sequence of operations described in the foregoing take place automatically, he or she can place a shoe assembly upon the right hand pad box, and place the right hand press into operation by depressing the right hand treadle switch 84.

While embodiments of the invention have been described for the purpose of illustration, it should be understood that the invention is not limited to the exact apparatus and arrangements of apparatus illustrated and described, as modifications thereof may be suggested by those skilled in the art, without departure from the essence of the invention.

What is claimed is:

1. A press comprising a cylinder having a piston movable therein, an inflatable pad carried by said piston, a work support spaced from said pad, means including a first valve for supplying fluid under pressure into said cylinder for causing said piston to move a work article on said pad against said support, means including a second valve for supplying fluid under pressure into said pad for inflating said pad to cause said pad to press said article against said support, a first solenoid for actuating said first valve, a second solenoid for actuating said second valve, means including a switch closed and then opened by an operator, and a relay energized when said switch is closed, for supplying electric current to said solenoids for actuating said valves to supply fluid under pressure into said cylinder and pad, a holding circuit closed when said relay is energized by the closing of said switch for maintaining said relay energized when said switch is opened, and timing means for opening said holding circuit after a predetermined period of time.

2. A press as claimed in claim 1 in which a second timing means is provided, and in which said means for supplying electric current to said solenoids includes means actuated by said second timing means for delaying the energization of said second solenoid until after said first solenoid has been energized.

3. A press comprising a cylinder having a piston movable therein, and inflatable pad carried by said piston, means including a first valve for supplying fluid under pressure into said cylinder or for exhausting fluid from said cylinder, a first solenoid for actuating said valve, means including a second valve for supplying fluid under pressure into said pad or for exhausting fluid from said pad, a second solenoid for actuating said second valve, means including a switch closed and then opened by an operator, and a relay energized when said switch is closed, for supplying electric current to said solenoids for actuating said valves to supply fluid under pressure into said cylinder and pad, a holding circuit closed when said relay is energized by the closing of said switch for maintaining said relay energized when said switch is opened, and means including timing means for opening said holding circuit and deenergizing said solenoids for actuating said valves to exhaust fluid from said pad and cylinder after a predetermined period of time.

4. A press as claimed in claim 3 in which a second timing means is provided, and in which said means for supplying electric current to said solenoids includes means actuated by said second timing means for delaying the energization of said second solenoid until after said first solenoid has been energized.

5. In combination, a pad box having an upper resilient diaphragm and a lower support member, a pad box support member, one of said members having pins extending therefrom towards the other member, and the other member having aligned openings therein into which said pins extend when said lower support member is in position on said pad box support member, said members having aligned openings through which fluid is supplied for dilating said diaphragm, and a gasket extending around said last mentioned aligned openings between said members.

6. A press having a cylinder with a piston movable therein, a pad box supporting member rotatably mounted on said piston, a pad box having a lower support member mounted on said pad box supporting member and having an upper resilient diaphragm, and means including aligned openings in said members for supplying fluid under pressure into said box for dilating said diaphragm.

7. A press as claimed in claim 6 in which the press has a table surface below said members with a curved slot therein, and in which piping connected to said opening in said pad box supporting member has a portion extending through said slot.

8. A press as claimed in claim 7 in which one of the members has pins extending therefrom towards the other member and in which the other member has openings into which said pins extend when said lower member is in position on said pad box support member.

9. A press as claimed in claim 8 in which a gasket is provided around said aligned openings between said members.

10. A press as claimed in claim 6 in which one of the members has pins extending therefrom towards the other member and in which the other member has openings into which said pins extend when said lower member is in position on said pad box support member.

11. A press as claimed in claim 10 in which a gasket is provided around the aligned openings between said members.

References Cited in the file of this patent

UNITED STATES PATENTS

| | | |
|---|---|---|
| 244,583 | Gifford | July 19, 1881 |
| 1,162,683 | Davenport | Nov. 30, 1915 |
| 1,217,401 | Brock | Feb. 27, 1917 |
| 1,610,265 | Davenport | Dec. 14, 1926 |
| 1,930,367 | Muscarella | Oct. 10, 1933 |
| 2,356,756 | Finn | Aug. 29, 1944 |
| 2,420,972 | Perri | May 20, 1947 |
| 2,534,343 | Eich et al. | Dec. 19, 1950 |
| 2,654,104 | Suerken | Oct. 6, 1953 |

FOREIGN PATENTS

| | | |
|---|---|---|
| 11,081 | Netherlands | May 15, 1924 |
| 313,307 | Great Britain | June 20, 1929 |
| 623,067 | France | Mar. 14, 1927 |
| 665,769 | Germany | Oct. 3, 1938 |
| 853,296 | France | Nov. 28, 1939 |
| 1,015,627 | France | Aug. 6, 1952 |